United States Patent [19]
Zavislan et al.

[11] Patent Number: 5,635,726
[45] Date of Patent: Jun. 3, 1997

[54] ELECTRO-OPTICAL SENSOR FOR MARKS ON A SHEET

[75] Inventors: James M. Zavislan, Pittsford; Scott R. Grodevant, Hilton, both of N.Y.

[73] Assignee: Lucid Technologies Inc., Henrietta, N.Y.

[21] Appl. No.: 545,298

[22] Filed: Oct. 19, 1995

[51] Int. Cl.$^6$ ............................................. G01N 21/86
[52] U.S. Cl. ........................... 250/559.44; 250/559.06; 235/456
[58] Field of Search ................. 250/559.44, 559.06, 250/214 R; 235/456, 462, 454, 464

[56] References Cited

U.S. PATENT DOCUMENTS

| | | | |
|---|---|---|---|
| 4,114,030 | 9/1978 | Nojiri et al. | 235/464 |
| 4,774,665 | 9/1988 | Webb . | |
| 5,283,699 | 2/1994 | Komai et al. | 235/462 |

OTHER PUBLICATIONS

Global Election Systems, Inc. Accu–Vote Hardware Manual, Oct. 1991.

*Primary Examiner*—Edward P. Westin
*Assistant Examiner*—Kevin Pyo
*Attorney, Agent, or Firm*—Martin Lukacher; Kenneth Lukacher

[57] ABSTRACT

An electro-optical sensor senses marks on a sheet which travels longitudinally with respect to a printed circuit board, carrying linear arrays of light sources (LEDs) and photodetectors and optics which define zones displaced laterally across the width of a sheet of paper, longitudinal columns of which can contain marks, the presence and absence of which marks is detected by the sensor. The sensor is especially adapted for use in detecting marks which indicate votes on paper ballots in electronic, computerized vote counting apparatus.

12 Claims, 10 Drawing Sheets

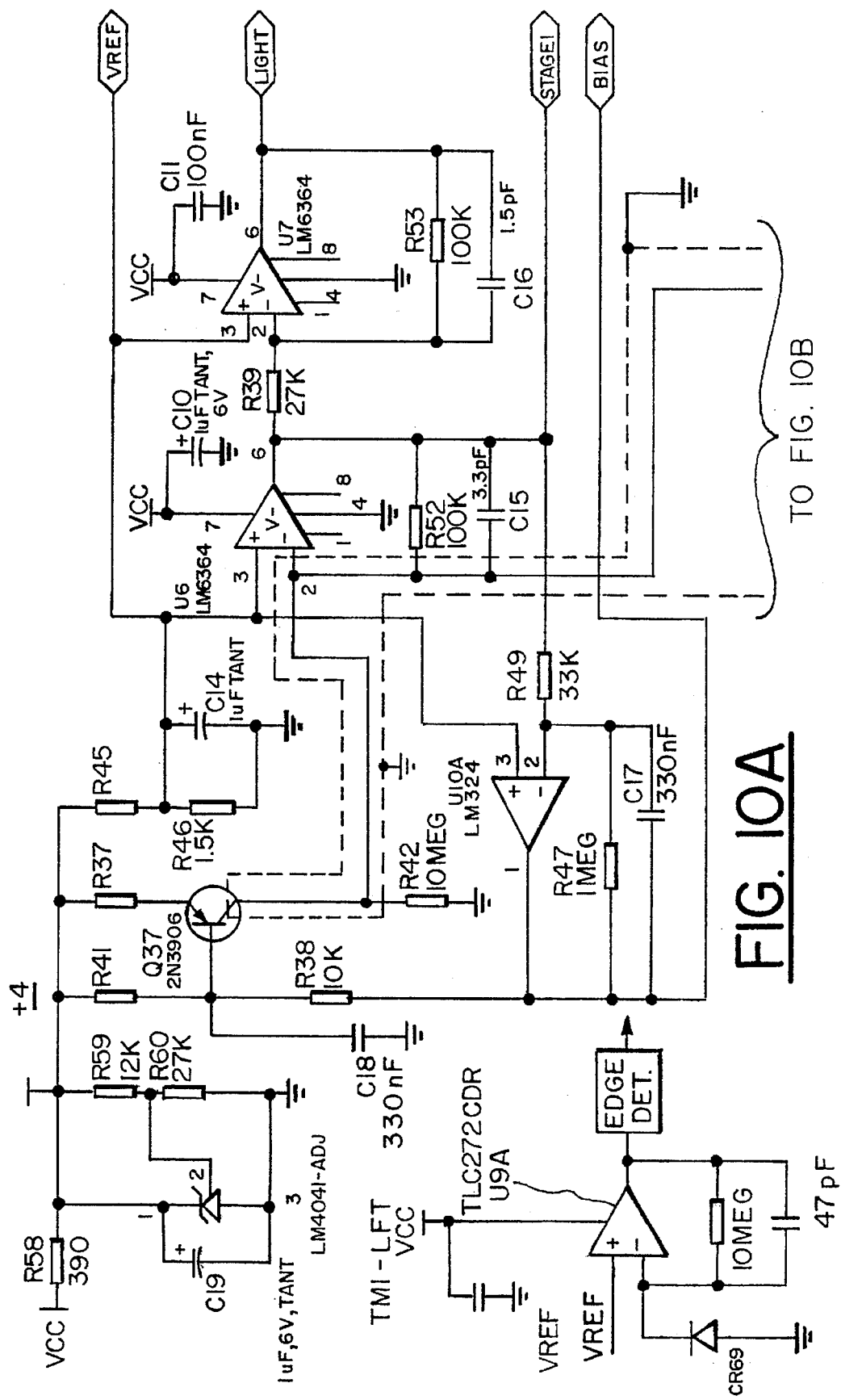

ELECTRO-OPTICAL SENSOR FOR MARKS ON A SHEET

DESCRIPTION

The present invention relates to electro-optical sensors and particularly to an electro-optical sensing system which senses the presence or absence of marks on a sheet as the sheet is scanned by the sensor.

The invention is especially suitable for use as an optical detection system for electronic voting apparatus which reads and counts votes corresponding to marks on a paper ballot which are made by a voter at places on the paper corresponding to candidates and issues to be voted upon. Such electronic voting apparatus is sometimes called electronic, computerized vote counting apparatus and may be of the type described in U.S. Pat. No. 4,774,665 issued Sep. 27, 1988 to Kenneth D. Webb. A commercially available vote counting apparatus is available from Global Election Systems, Inc. of Vancouver, British Columbia, Canada and called the "Accu-vote". The sensor provided by the invention may also be used in scanning answer sheets and other optical information bearing media to derive information from optically discernable marks thereon and is also useful wherever a linear or continuous detector array is required in that it enables such an array to be provided by a plurality of discrete photodetectors, such as photodiodes which are spatially arranged to detect light throughout a pre-defined detection region as may be required by the application to which the detector array is to be put.

Sensing of marks, especially when the marks are on a paper ballot, should sense these marks as they are perceived by the person who makes them on the sheet (the voter on the ballot). The sensor must not fail to read such marks nor must marks which are out of prescribed locations be read so as to create the danger of counting false marks. Marks are read on the basis of the density of the illumination. This illumination may be deflected from the paper, although it is within the scope of the invention, especially when the paper is thin, to sense the marks from illumination which is transmitted through the paper. Reflected illumination is mentioned hereinafter for purposes of illustrating the presently preferred embodiment of the invention.

In order that marks are sensed by the sensor as perceived in their existence and location by the voter, it is necessary to avoid optical conditions which will interfere with the sensing of the marks as perceived. Thus, the use of non-visible illumination (for example infra-red or IR) may give rise to such conditions. Certain marking materials do not absorb in the infra-red, for example those made by felt tip markers or ink jet printers. Voting on paper ballots in many states is not restricted to specific voting places or precincts. Thus, the use of the marking media is not controllable by the election officials. While IR sensitive detectors have the benefit of less sensitivity to ambient light than do visible light sensitive detectors, it has been found, in accordance with the invention, that the effects of ambient illumination, as well as variation in photo currents and particularly in dark current response and in the characteristics of signal handling and processing amplifiers associated with the detectors, may be compensated without affecting detection thresholds for actual marks.

Another problem related to the marking medium arises out of the use of pencil. The oriented graphite layer of a pencil mark produces specular (mirror-like) reflection rather than diffuse reflection, and effectively reduces the contrast of the reflected illumination so that a pencil mark may not be detected because it produces a signal below the threshold for detection of an actual mark. It is a feature of this invention to use polarized light which is transmitted from the sources of illumination (e.g., LEDs) and is received at the photodetectors (photodiodes for example) via cross-polarizers. Specular reflection is then attenuated thus enhancing contrast of the mark.

In order to detect marks at desired locations which may be in adjacent columns spaced laterally across the sheet, it is desirable to constrain the sensing action to discrete and contiguous zones which are spaced laterally corresponding to the columns in which actual marks are supposed to be made. Leakage of light from regions including other zones which are not being interrogated should be restricted and reduced to a level where such leakage light does not produce signals exceeding the threshold for actual mark detection. The use of apertures or so-called optical hard stops to define the zones in which the paper is illuminated and from which marks may be detected may be undesirable, because apertures tend to vignette illumination which is not directly perpendicular to the zone. Space requirements for the sensor package preclude the use of perpendicular angles (normal) incidence and reflection. In addition, lateral paper meandering, as well as paper motion toward and away from the detector can cause vignetting and effectively modulate the intensity of the detected illumination to an extent where actual marks may produce illumination below the threshold for detection. It is a feature of the invention to provide an electro-optical sensor capable of sensing marks in discrete and adjacent zones on which illumination is focused and from which reflected illumination is focused on photodetectors without the use of apertures or stops to define the zones and without requiring normal incident and reflected illumination to and from the zones.

Paper, especially ballots which are marked, may be folded or even spindled, creased or so mutilated as to have a non-uniform surface. As in the above-referenced patent and in the Accu-vote system the paper ballots are inserted into a slot and then mechanically engaged and driven through the sensor. In this connection it is desirable that both sides of a ballot be read simultaneously during one pass through the sensor. Accordingly, it is desirable to have two sensor boards on opposite sides of the paper. This exacerbates the non-uniformity of the surface presented to the sensors, for example one sensor board may see a peak in the surface while the sensor reading the opposite side of the paper sees a valley. Such peaks and valleys can cause paper motion with respect to apertures, if used in the sensor, which can affect reliable reading of the marks. It is a feature of this invention to provide sensors which use cylindrical rod lenses which extend laterally over the columns of marks and which form the discrete zones of illumination and detection without the need for apertures. The rods also provide a mechanical reference surface which sets the distance between the illumination and detection components of the sensors and the surface of the paper. The reference surface is maintained in contact with the paper by applying a spring pre-load to the sensor assembly in the direction of the paper via flexures on which the sensor assemblies are mounted. The rods thus provide a mechanical means for setting the distance of the sensor assembly to the paper and locating the zones at the paper in locations corresponding to the columns where marks may be placed by the voter. In accordance with another feature of the invention, the unitary sensor assembly includes a board, preferably a printed circuit board which serves as an alignment fixture which locates the illuminating beam (a solid cone of illumination emanating preferably from a source having a lenslet which focuses the light from the LED junction). The beam may then be adjusted in the plane of the board (in x and y) as well as in angular inclination with respect to the rod lens so as to be focused by the lens, which condenses the beam into a generally oblong shape which is narrowest in the longitudinal direction along the columns and of the width of the columns and with a spacing in a lateral direction corresponding to the spacing of the columns. Similarly, the photodetectors may be photodiodes attached, as by soldering, aligned over an opening in the board offset longitudinally from the LED which scans the same zone and on which the reflected light is focused by the rod lens.

Since there are a multiplicity of columns which can contain marks on the paper (for example 32 columns) as well as two columns along the right and left opposite edges of the paper for timing and orientation mark detection, the collection of signals from the photodetectors and the allocation of signals to each column without complex electronic circuitry, for example for multiplexing the numerous photodiodes, becomes very desirable. Multiplexing of the photodiodes is avoided in accordance with the invention, and the multiple photodiodes are made operationally equivalent to a single linear detector, even though implemented through an array of a multiplicity of discrete detectors. This is accomplished by electrically chaining the detectors in a parallel electrical configuration and by strobing the LEDs so that the zones are illuminated successively. Polarizing the illumination light and collecting the orthogonal polarization onto the detectors perpendicular to the axis of the rod lens reduces the effect of any leakage light from the zone which is not being illuminated at the time. Furthermore, compensation for ambient lighting conditions, for the dark current of the photodetectors and further, for non-ideal characteristics of the signal processing circuits which process the signals from the photodetectors (especially the transimpedance amplifier) is obtained without the need for AC coupled circuitry for capacitively coupling output signals from the photodiodes. In accordance with the invention, a compensating circuit controls, on an essentially steady state basis (without affecting signals produced at scanning rates at which the sensor is operative) by controlling the biasing of the photodiodes, which except for one of the photodiodes which independently tracks a timing channel, are connected in parallel. Effectively the bias of an amplifier to which the summing junction of all of the parallel connected photodiodes supplies its output current to the amplifier is controlled by comparing the output of the amplifier with a reference voltage, but only for those components of the output which are at frequencies lower than the signal frequencies due to scanning of the marks on the paper. The timed output from the parallel connected photodiodes corresponds to the outputs from each data column as it is being scanned and may be digitized and applied to the computer of the electronic, computerized vote counting system.

Accordingly, it is the principal object of the present invention to provide an improved electro-optical sensor wherein one, more, or all of the foregoing problems and disadvantages of electro-optical sensing apparatus heretofore known or available and particularly sensors used in electronic computerized vote counting systems which have heretofore been proposed, are substantially obviated.

It is another object of the present invention to provide an improved linear sensor array as a unitized assembly on a board mounting light sources and photodetectors and having a cylindrical lens which provides a mechanical reference for the unitary assembly when spring biased against the surface of the medium on which optical detection is being carried out in a manner to provide discrete contiguous (which may be adjoining or spaced) zones for illumination and detection of areas on the surface containing optically discernable information.

It is a still further object of the invention to provide an improved sensor utilizing an array of photodetectors having a common output and which is compensated for dark current, ambient light conditions and processing conditions on a steady state basis without adversely affecting the detection of actual signals, even when the photodetectors are connected in parallel.

It is a still further object of the present invention to provide a unitary electro-optic assembly wherein a board has alignment facilities for photodetectors and light sources and mounts a lens which can provide a mechanical reference as well as for focusing of the light from the sources on detection zones and from the zones onto the photodetectors.

It is a still further object of the present invention to provide an improved electro-optical sensor having an array of light sources which produce beams of illumination and an array of photodetectors, each of which corresponds to a different light source in the light source array, and from and to which polarized light having cross-polarizations is focused at a plurality of detection zones.

It is within the purview of the present invention to achieve one or more of the foregoing objects, and in a preferred embodiment of the invention, to achieve all of the foregoing and other objects of the invention.

Briefly described, an optical sensor embodying the invention utilizes a board extending laterally over a path along which is moveable a sheet containing marks in selected areas in adjacent columns which extend longitudinally of the sheet. An array containing a plurality of light sources and photodetectors with a separate light source and a photodetector pair for each column, is mounted on the board. The separate pairs are spaced longitudinally from each other and photodetectors are also spaced laterally from each other to constitute the array. A rod defining a cylindrical lens is mounted on the board, extending laterally along the board to define a plurality of discrete laterally spaced zones coincident with the columns of selected areas. Illumination from the sources is focused in the zones and illumination from the zones is directed on the detectors. The board is the base of a unitary structure containing the array and the lens, which structure may be flexurally mounted to provide a spring pre-load against the sheet thereby reducing variations in the distance between the board and the sources and photodetectors of the array thereon and the surface of the sheet which may contain the mark. Polarizing material which transmits light having transverse directions of polarization is disposed between the sources and the rod lens and between the rod lens and the detectors, respectively, thereby facilitating the transmission of diffuse reflected light and discriminating against specular reflected light as well as light from outside the zone being illuminated.

The photodetectors in the array may be connected in parallel and signals corresponding to the columns may be obtained by strobing the sources to successively illuminate the zones spatially corresponding to the columns. The common junction of the parallel connected photodetectors is to an amplifier, preferably a transimpedance amplifier, the output of which is connected to a feedback circuit which controls the bias to the amplifier thereby compensating for dark current variations, ambient light conditions and variations in the amplification characteristic of the amplifier. The feedback circuit has a frequency characteristic which follows relatively slow variations but does not follow variations in signals at higher frequencies at which the paper is scanned, whereby to compensate for dark current and the like.

The foregoing and other objects, features and advantages of the invention as well as a presently preferred embodiment thereof will become more apparent from a reading of the following description in connection with the accompanying drawings in which.

Figure 1:
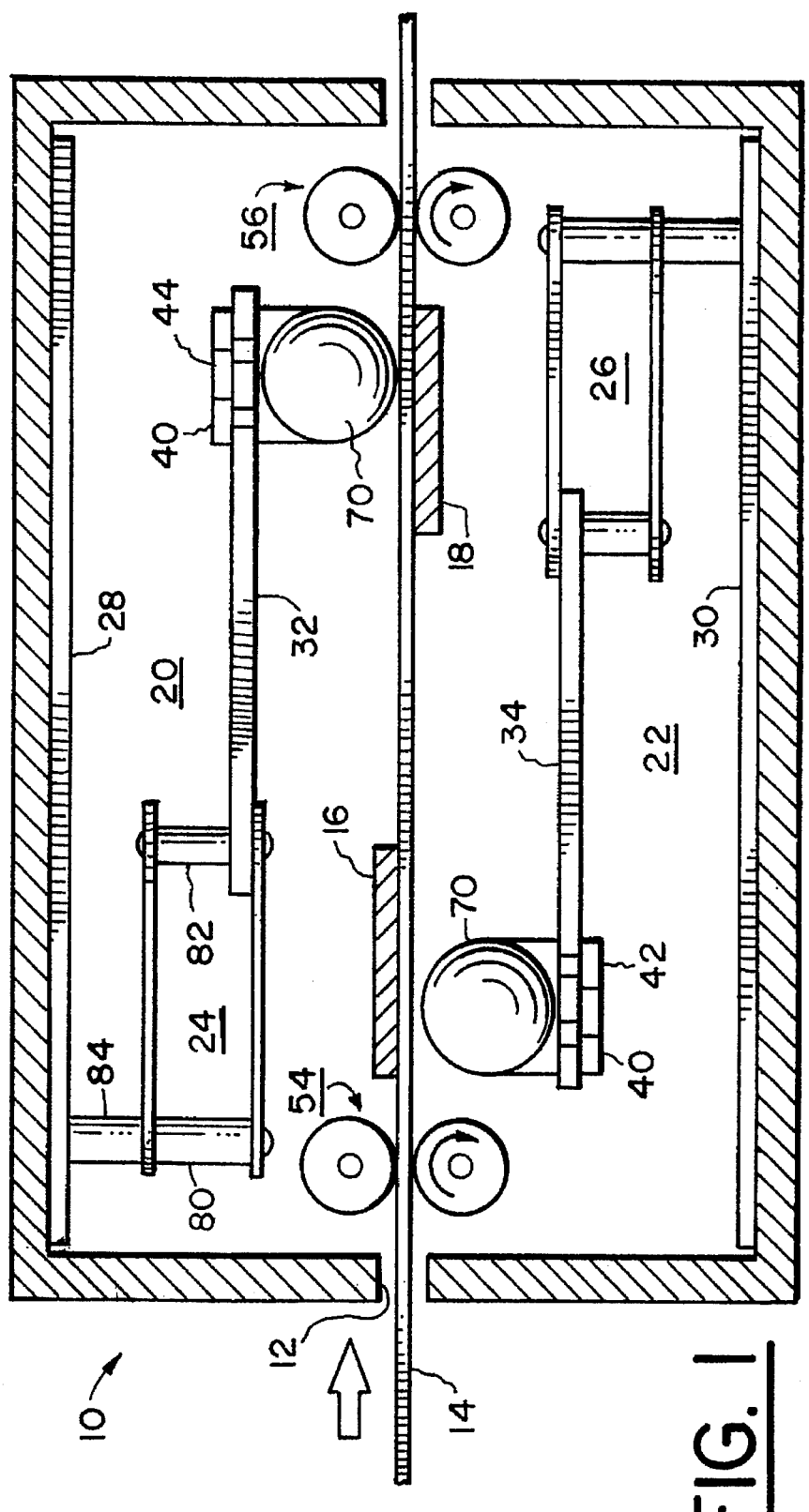
FIG. 1 is a schematic diagram showing in cross section the internals of an electro-optic sensor for sensing marks on voting ballots on opposite sides thereof, the sensor being provided in accordance with the invention.
Figure 3:
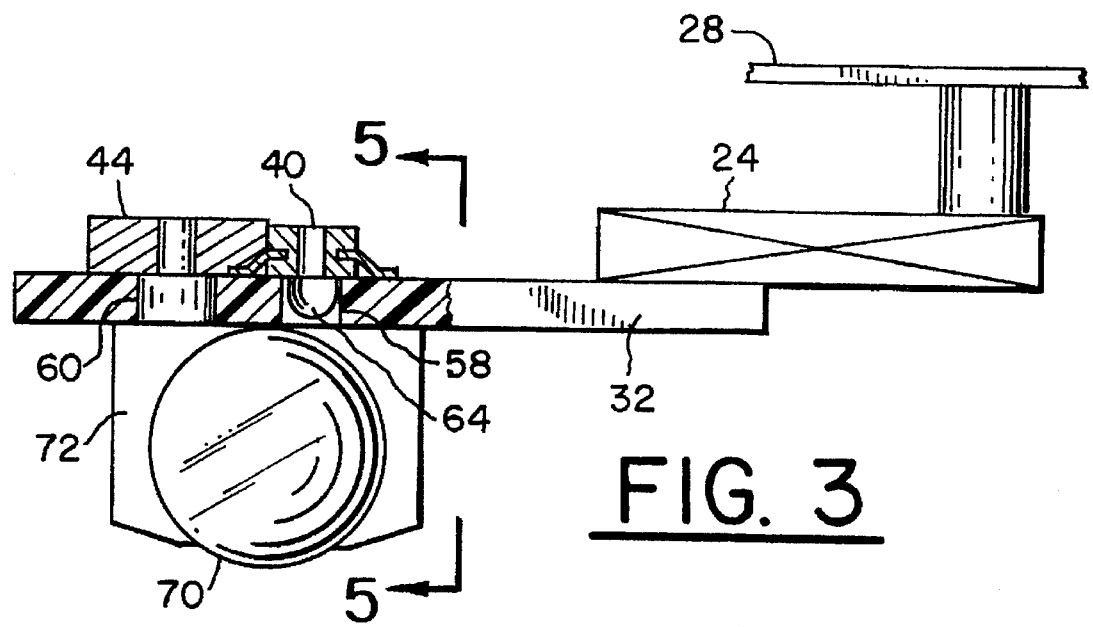
FIG. 3 is a view of the unitary sensor assembly taken from the right end as shown in FIG. 2 and showing the array of LEDs and photodetectors as well as schematically showing the flexural mounting for the sensor assembly.
Figure 4:
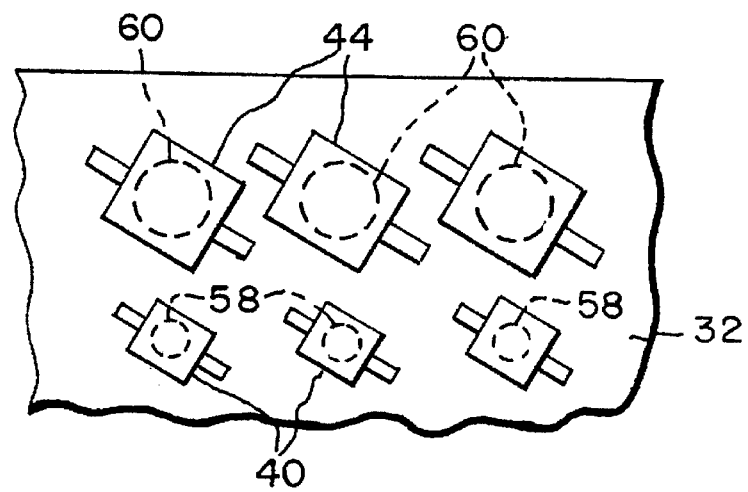
FIG. 4 is a fragmentary plan view of the board showing three surface mount LEDs and three corresponding surface mount photodiode detectors so as to illustrate the orientation thereof and packaging thereof in closely spaced relationship so as to define zones in a multiplicity (for example 34) adjacent channels extending longitudinally along the paper ballots.
Figure 5:
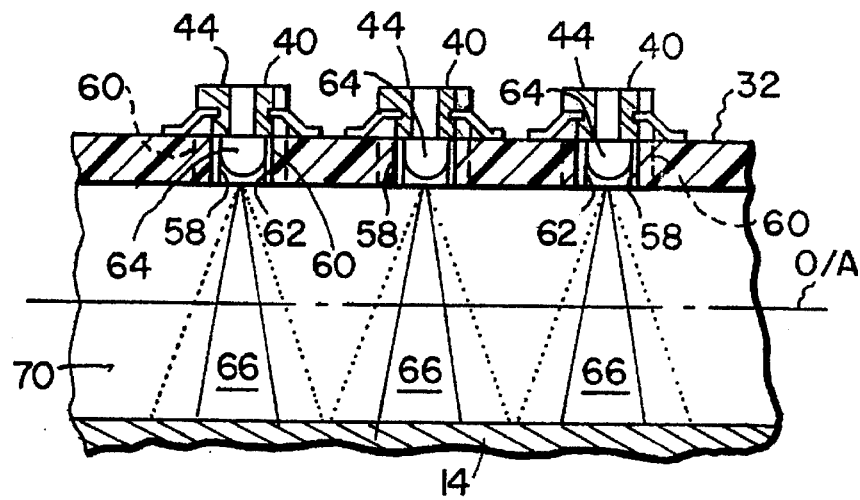
FIG. 5 is a fragmentary, sectional front view of the board and the rod as viewed in the direction of the arrows 5—5 in FIG. 3.
Figure 8:
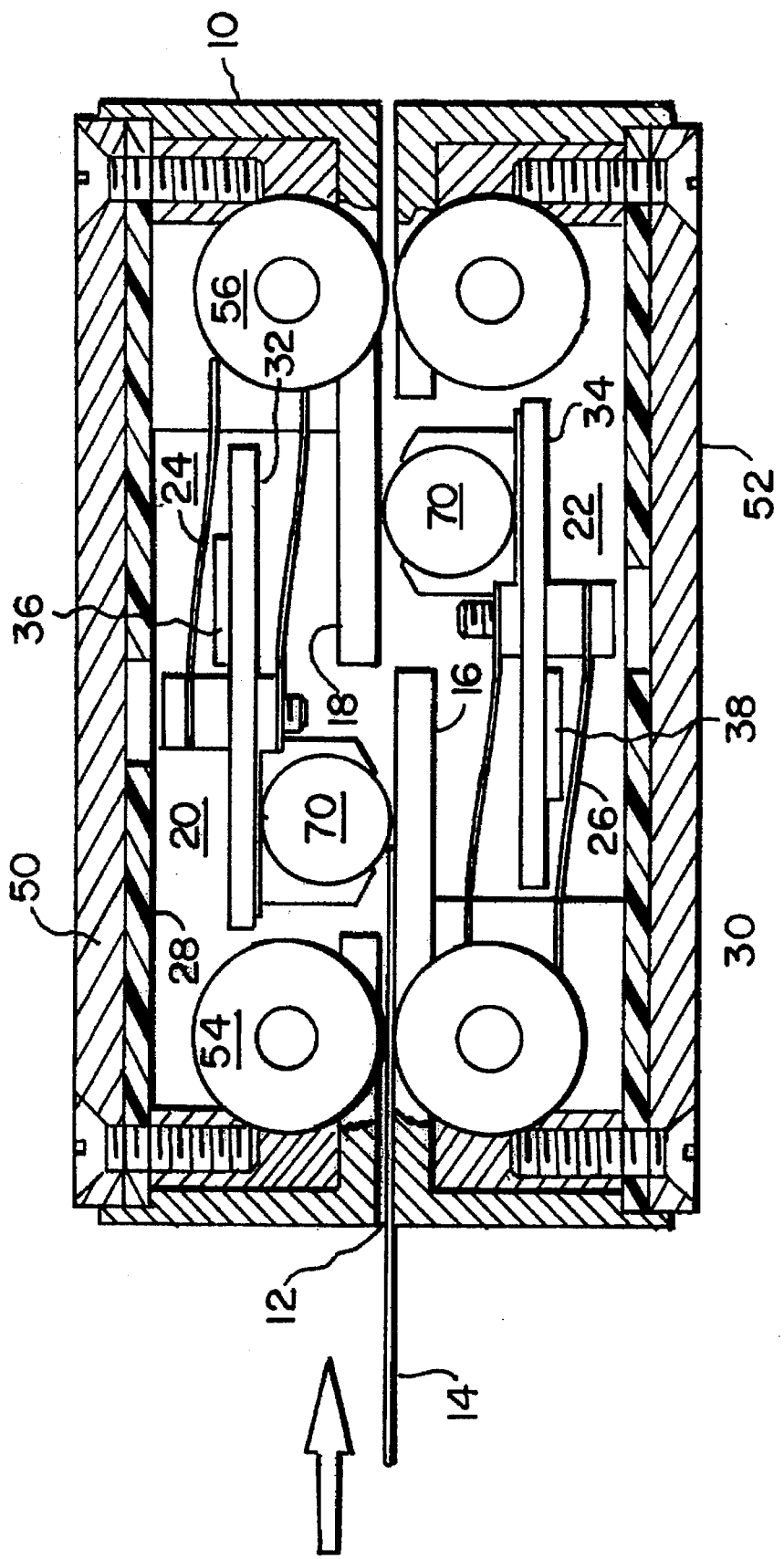
FIG. 8 is a more detailed view similar to FIG. 1, illustrating in cross section the electro-optic sensor illustrated in FIG. 1.

Referring first to FIGS. 1 and 8, there is shown a generally rectangular housing 10 having a slot 12 for a paper ballot 14. The slot is defined by partitions 16 and 18 against which the opposite surfaces of the paper ballot bear and against which the ballot is pre-loaded during sensing by unitary sensor assemblies 20 and 22. The sensor assemblies are mounted via flexures 24 and 26 on printed circuit controller boards 28 and 30. These boards, like printed circuit boards 32 and 34 of the sensor assemblies 20 and 22 have printed wiring leads and components such as resistors, capacitors and integrated circuits mounted on a surface thereof. Illustrative ones of these components 36 and 38 are shown on the boards 32 and 34 a corresponding pair of light sources (LEDs) 40, 42 and PIN diode photodetectors 44, 46 are shown in FIG. 1 and also in FIG. 3.

The controller boards 28 and 30 are mounted on the top and bottom of the housing 10 and may be screwed in place and clamped by top and bottom covers 50 and 52 as shown in FIG. 8. The paper 14 is driven through the slot 12 by pinch roller mechanisms 54 and 56 containing rubber rollers, one of which each set 54 and 56, which is indicated by the arrows to show direction of rotation, is driven by a paper drive or scan motor.

Referring to FIGS. 2 through 5 one of these unitary sensor assemblies 20 is shown in greater detail. The printed circuit board 32 has a lateral dimension equal to the width of the paper 14 and has two rows 58 and 60 of through holes which are preferably plated through holes plated with metal or other optically opaque material. The plating is shown for the holes 58 as collars 62 around the holes. The holes serve as alignment devices for surface mount LEDs. These are LEDs which radiate illumination in the visible portion of the spectrum, for example 621 nm. Such LEDs are available from Hewlett Packard, as their model HLMA-QH00. The LEDs 40 and photodetectors 44 are also surface mount devices. For example, the photodetectors may be model BPW34 obtainable from Centronics or Siemens Electronics. The LEDs 40 have noses 64 containing lenslets which are located in x and y in the holes 58 on centers approximately ¼" apart corresponding to the longitudinal columns of the paper 14 in which marks should be placed in voting operations. The noses and the plated two holes 58 serve to align the axis of beams of illumination 66 to zones 68.

Figure 6:
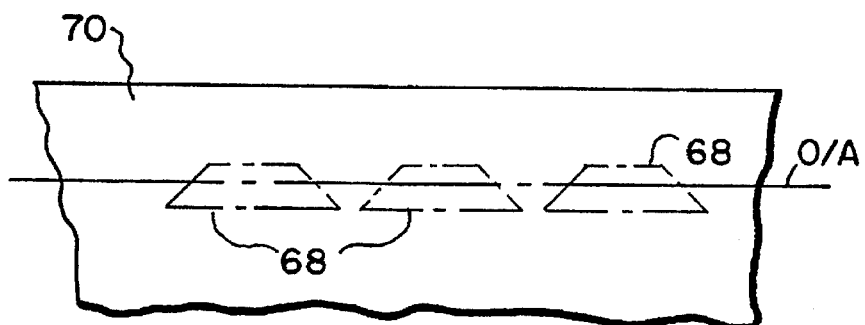
FIG. 6 is a fragmentary bottom view of FIG. 5 illustrating the discrete, generally trapezoidal and contiguous illuminated zones from the three sets of LEDs and photodetector which are focused by the cylindrical rod of the sensor assembly.
Figure 7:
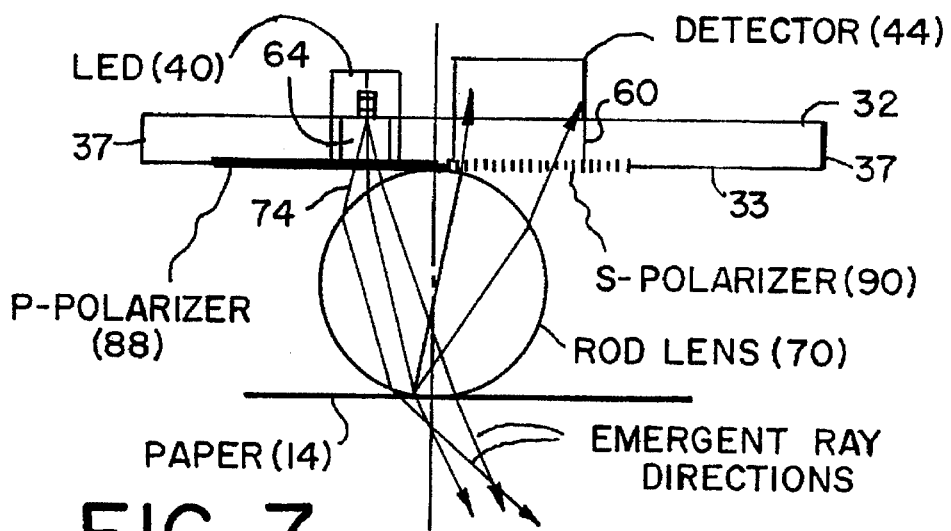
FIG. 7 is a schematic diagram similar to FIG. 3 but viewed from the opposite end, showing illustrative rays of illumination from one of the LEDs and the focusing of the light from a zone on the paper to the detector of the array corresponding to the illustrated LED.

These beams are focused by a cylindrical rod lens of such fused (amorphous) quartz 70 (refractive index on equals about 1.5) non-birefringent optically transparent material. The rod lens is held and assembled to the board 32 by brackets 72. The center line through the optical axis of the rod lens 70 is between the rows of LEDs 40 and detectors 44, such that refraction occurs through surfaces on opposite sides of the rod lens 70. The orientation of the LEDs is such that the beams (center of the cone of propagation of illumination 74) emanating from the lenslet 64 is condensed by virtue of Snells law to approximately 14° in the rod lens along the axis of the rod lens 70 (the diameter of the rod lens in this illustrative embodiment being approximately 8 mm) along a perpendicular to board 32 through the rod lens. The light is approximately collimated inside the rod. The area of the zone external to the rod is slightly trapezoidal in shape. See, FIG. 7 as well as FIG. 6. The light reflected from the paper at the zone is collected by the rod lens. The reflected beam diverges to fill the active area of the photodiode 44 as shown in FIG. 7. There is therefore an acute angle (about 36° being suitable) between the incident and reflected illumination. There are no hard stops or apertures in the way of the illumination. The contiguous, adjacent zones 68 are focused by the rod lens 70.

Figure 2:
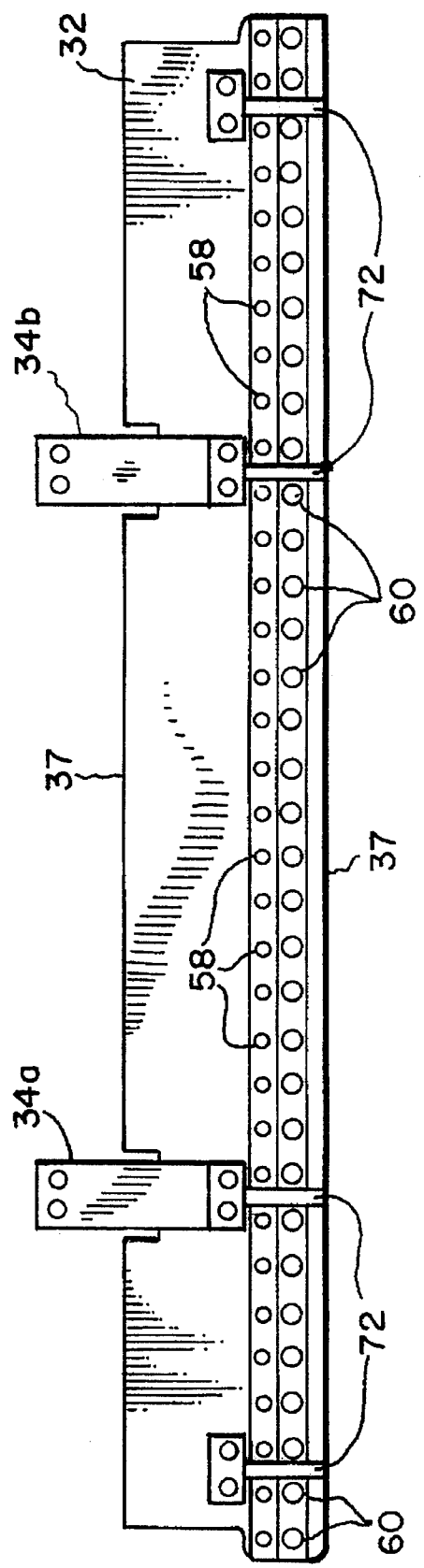
FIG. 2 is a plan view of the sensor from which the array of LEDs and photodetectors has been removed to illustrate the fixturing in the board containing the array for location and alignment thereof.

The rod lens surface also provides a mechanical reference which applies a pre-load spring force due to the flexures 24 and 26 against the paper 14 on the platforms 16 and 18 thereby smoothing creases and folds in the paper and setting the distance between the LEDs 40 LEDs and detectors and 44 and the paper so as to maintain the location and position of the zones 68 with respect to the sensor board 32. The flexures 24 and 26 are strips of spring material, such as stainless steel which are mounted via spacers 80 and 82 and 84 to each other and to the controller boards 28, 30 and the sensor boards 32, 34. There are two sets of flexures 34a and 34b, as shown in FIG. 2, for each sensor board which permits both lateral rocking and vertical displacement of the rod so as to maintain the reference surface provided by the rods 70 in contact with the paper 14. The optical geometry of the sensor is therefore substantially fixed and the rod serves the dual purpose of a mechanical reference as well as of a focusing device for the illuminating and reflected light from the zone.

Sheets of plastic material are disposed along the underside 30 of the sensor boards on opposite sides of the center line through the rod lens. These sheets are indicated as being p polarizer and s polarizer materials 88 and 90 in FIG. 7. Plastic sheets or layers may be used for the polarizers. The p polarizer material polarizes the light from the LEDs in a plane containing a normal to the surface of the rod 70 and the axis of the incident beam on the rod 70. This is the plane of incidence of the illumination. The s polarizer is polarized 90° to that plane. In other words, light which is polarized perpendicularly to the edges of the board 32 passes from the LEDs 40 into the cylindrical lens and is incident on the zone 68. The detector 44 is sensitive to s polarized light which is parallel to the edges 37. The p polarized light has a relatively high transmission efficiency into the rod lens 70 because a significant fraction of light is incident at around Brewster's angle where the Fresnel reflectivity coefficients are minimum for p polarized light.

Specular reflection effects can occur when the angle of illumination equals the angle of collection as referenced against the normal surface of paper 14. Specular reflection can reduce the contrast of a pencil marked zone and can prevent detection of a pencil mark. However, the specular reflection is not transmitted to the detector 44 because it is principally p polarized (with the same polarization as the incident illumination). This p polarization is blocked by the s polarizer 90. When the p polarized illumination hits the marked zone it becomes random polarization due to diffuse scattering. The diffuse light has a large s polarization component, because it is at a relatively small angle (for example, approximately 14° to a normal to the detection plane of the detector).

Consider illumination from adjacent zones (spurious, spillover illumination) which might occur if the timing of the strobing of adjacent LEDs cause overlapping zones or areas laterally displaced from the zone of interest to be illuminated. Then, the vector of s polarized illumination is foreshortened since it is seen at the detector at an oblique angle. The intensity of illumination received at the detector is attenuated as a function of the square of the cosine of the oblique angle. Accordingly, the zones 68 of illumination are essentially discrete even though they are contiguous. Spillover illumination is thereby reduced. Furthermore the refraction of the rod along its axis reduces the maximum internal angle of light propagation in the plane containing the rod axis and the paper normal to 43°. Light travelling at 43° inside the rod is from light scattered at 90° in the air. Very little light is collected by the lens and transmitted through to the detectors because of the high Fresnel reflectivity for s-polarized light at large incidence angles. In addition, the collars provided by the plated through holes around the LED noses 64 prevent leakage of light between LEDs and detectors via the sensor boards and further contribute to the provision of only discrete zones of illumination, each corresponding to a separate data channel on the paper at which marks are supposed to be made.

Figure 9:
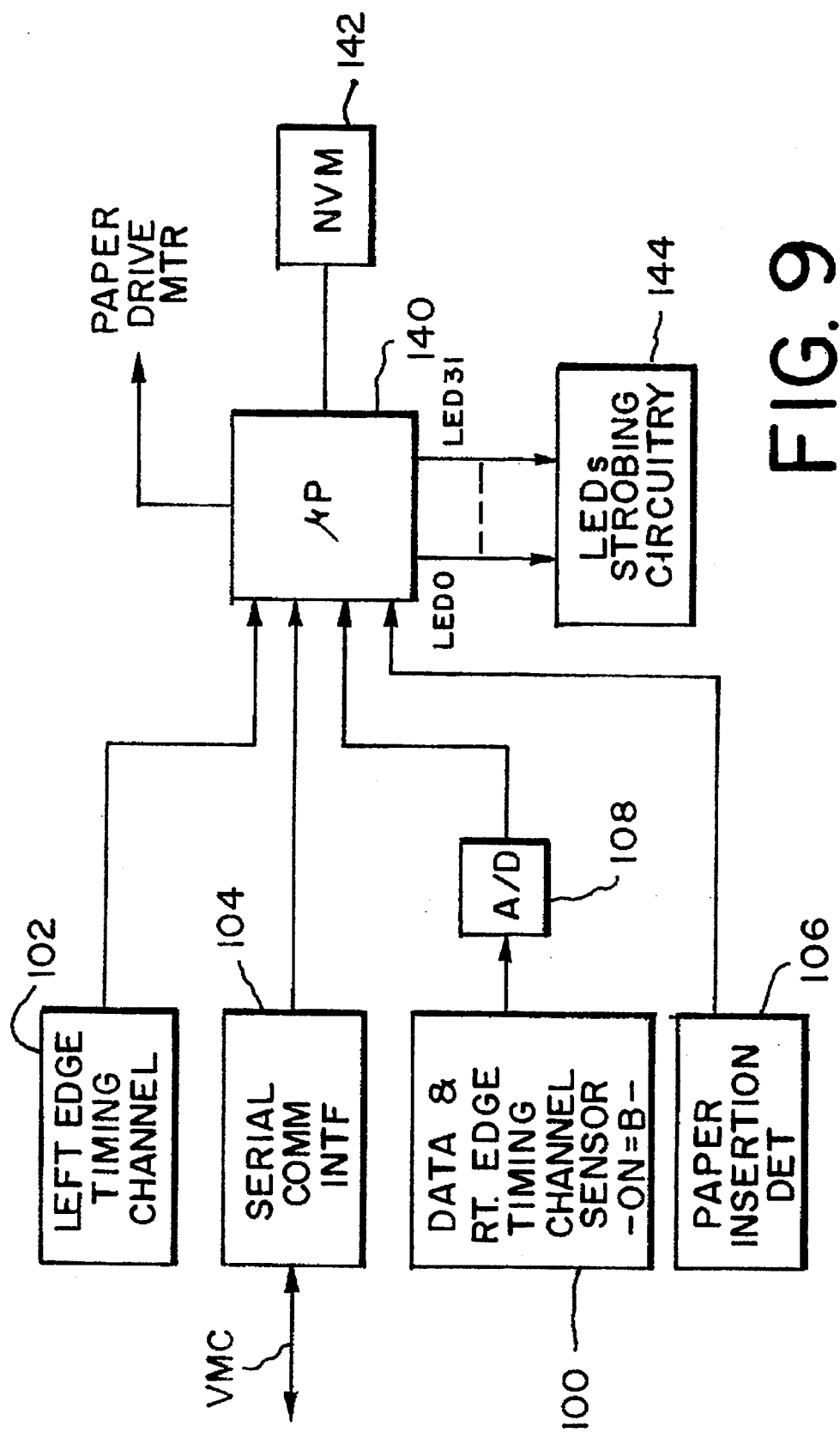
FIG. 9 is a block diagram of the electrical system of the sensor shown in FIGS. 1 and 8.
Figure 10B:
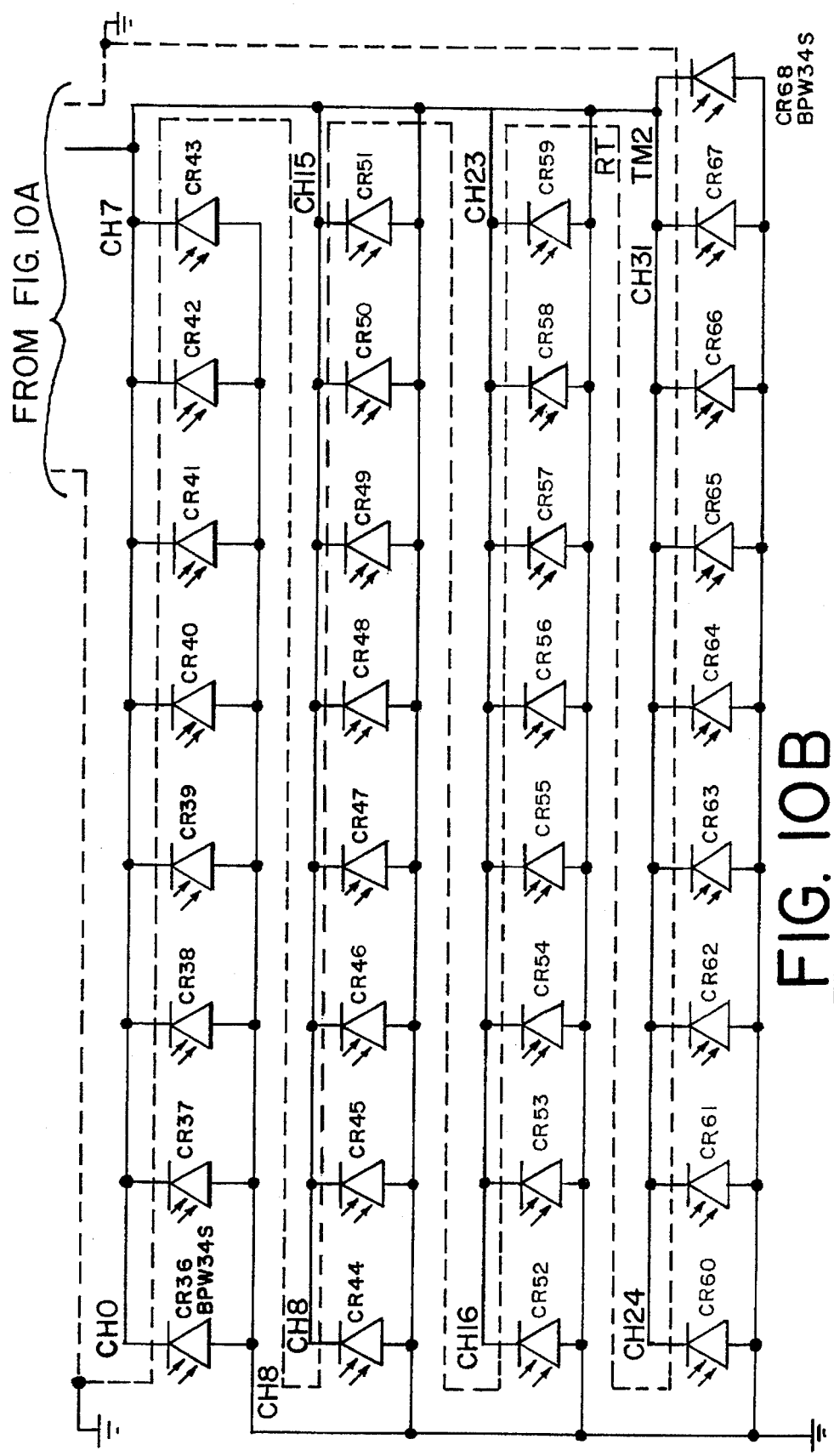
FIGS. 10 and 11 are respectively a schematic diagram illustrating the circuitry connecting the array of photodetectors and the circuitry for strobing the LEDs of the electro-optic sensor illustrated in the preceded figures.

Referring to FIG. 9 there is shown the system contained on the sensor and controller boards. The data channel and right edge timing channel sensors and their associated circuits which are shown in greater detail in FIG. 10 are indicated in block 100. The circuit of the left edge timing channel 102 detector, which is also illustrated in FIG. 10, is also on the sensor board. It will be appreciated that the circuits shown in FIG. 9 are replicated for each of the sensor and controller boards which read opposites sides of the paper.

The amplified data, after edge detection in the case of the left edge timing channel is applied to a computer, namely a microprocessor 140 which is programmed by data in a non-volatile memory (NVM) 142, such as an EPROM. The microprocessor 140 also receives data via a serial communication interface 104 from the computer of the electronic computerized voting machine. There is also an input in the sensor on the housing next to the throat of the slot (not shown in the drawing) at which a paper insertion detector 106, such as an electro-optical detector, is located.

The microprocessor 140 provides output to control the paper drive motor as well as to operate circuitry 144 to strobe the LEDs of the 32 data channels and the right edge timing channel.

In operation, when paper is inserted into the throat of the slot 12 (See FIGS. 1 and 8), a signal from the microprocessor initiates paper motor drive and starts a sequence of strobes which successively turn on the LEDs (CR36 through CR68) FIG. 10. These are the data channel LEDs and the right timing channel LED (there are 32 data channels CH 0 through CH 31). There is also the right timing channel (RT TM2). There is an LED for the left timing channel. That LED is turned on and stays on so long as the presence of paper is detected.

The left channel detector CR69 is illustrated in FIG. 10. The detectors CR36 through CR68 are connected in parallel to a common summing point which is an input (the inverting input) of an operational amplifier U6. U6 in combination with resistor R52 and capacitor C15 form a frequency compensated, transimpedance gain stage. A second frequency compensated inverting gain stage is formed by U7 and resistors R39 and R53 and capacitor C16 to provide additional signal gain. The output from U7 is the output of the sensor and indicated at "light" in FIG. 10. This output is digitized by an analog digital converter 108 and applied to the microprocessor. The output from the timing channels is used in the microprocessor to provide timing information via the serial communication interface to the voting machine computer as indicated by the lead VMC in FIG. 9. The timing of the strobes is internally generated in the microprocessor 140, under the control of VMC via the communication interface 104 so that all of the 32 data channels and the right timing channel are strobed for each 10 mils (0.010 inch) of paper movement through the slot 12. The system therefore obtains the data channel information without multiplexing or switching of the signals from the photodetectors CR36 to 68 and sufficient information is obtained from the data channels to assure that a mark is not missed.

Figure 11A:
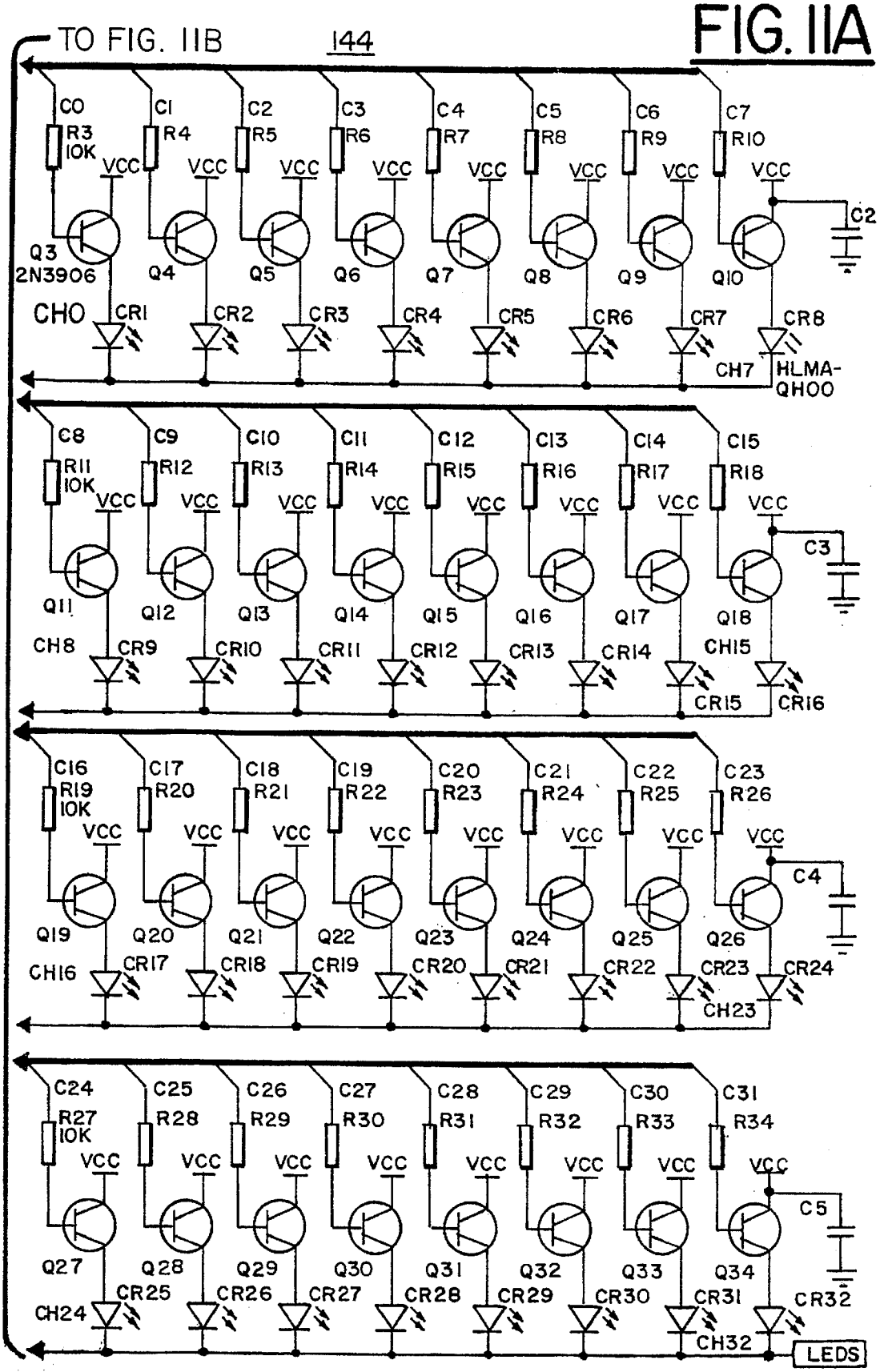
Figure 11B:
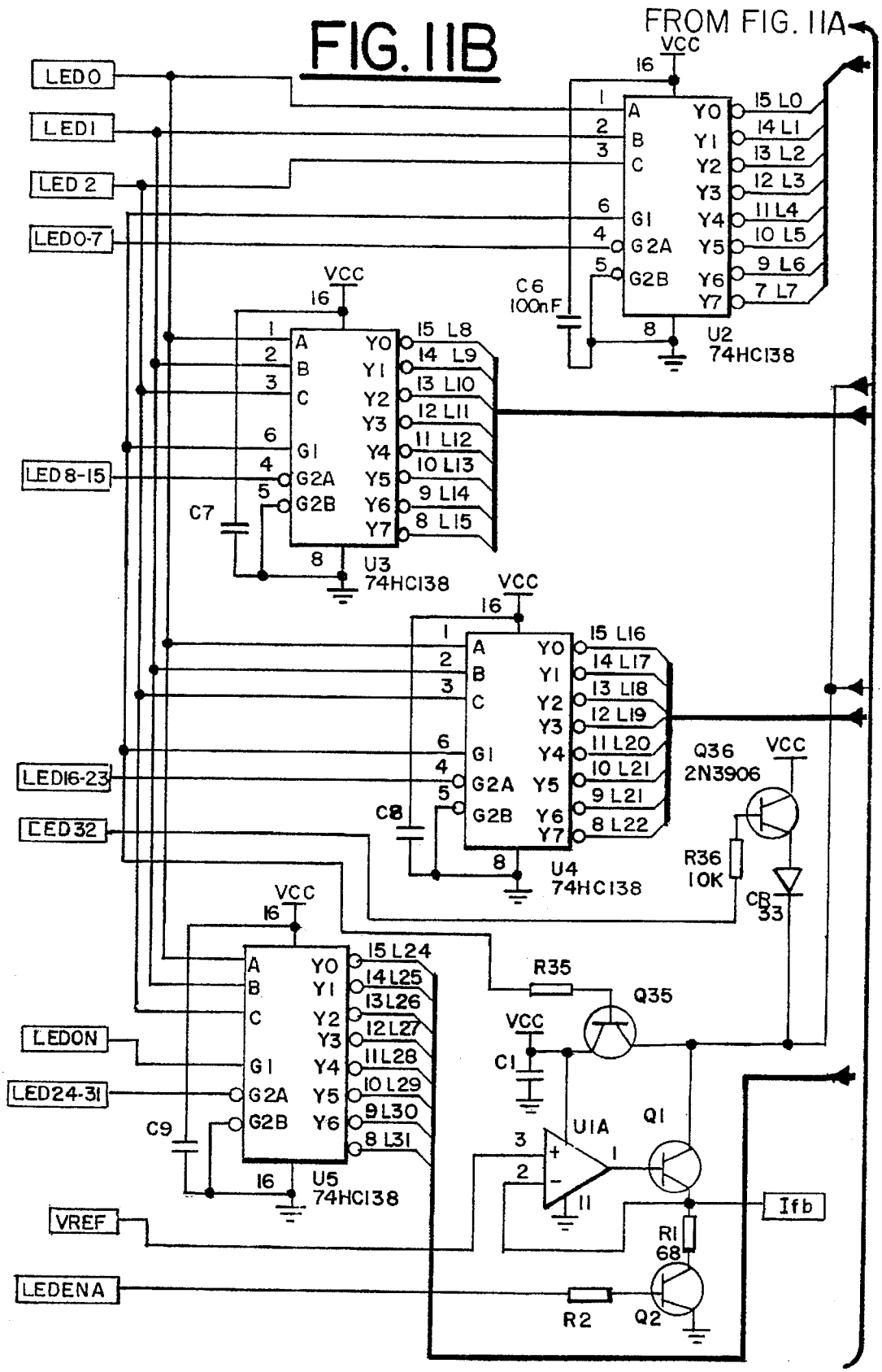

Referring to FIG. 11, there is shown the LED multiplexer circuit. The LED multiplexer drives one of a multiplicity of LEDs with constant current drive to insure relatively uniform LED luminescent intensity.

An individual LED is selected by the states of eight digital input signals: LED0, LED1, LED2, LED0–7, LED8–15, LED16–23, LED24–31 and LED32, which are controlled by the microprocessor. Two additional digital control signals: LEDON and LEDIEN enable all LEDs and the LED current source, respectively.

A constant current regulator is formed by amplifier U1a, transistor Q1, and resistor R1 which is readily recognized by those skilled in the art as a constant current load. The LED current is established by the reference voltage, preferably 2.5 V, divided by the value of R1. The LED current is selected to produce sufficient luminous energy so that the corresponding photodetector produces easily detectable photocurrent. Transistor Q2 and base bias resistor R2 allows the microprocessor to turn-off the current source to conserve power when all LEDs are off, such as when the unit is not scanning ballots. Transistor Q35 acts as a shunt and is enabled when the LEDON signal is false (low). It provides a current path for the constant current regulator in the absence of a selected LED, to prevent current overshoot when an LED is later selected. Capacitors C2 through C9 are supply bypass capacitors.

U2 through U5 are 3-to-8 decoders, such as the generic 74HC138 (made by national Semiconductor, Motorola and many other manufacturers). Digital input signals from VMC via the interface 205 (FIG. 9) LED0–7, LED-8–15, LED16–23 and LED24–31, when low, enable U2 through U5 respectively. When enabled the decoder device activates (switches low) one of its eight outputs (pins 7, 9, 10 through 15) that corresponds to the binary value applied to the LED0 through LED2 inputs, respectively. Each decoder device drives eight base resistors (R3 through R34) that in turn drive eight saturated transistor switches (transistors Q3 through Q34). The transistor switches connect the anode of their associated LED (LEDs CR1 through CR32) to VCC (the power supply), thus completing a current path through the selected LED (to light the LED). Selecting more than one LED at once is avoided (because the current source current divides between the selected LEDs, causing each to be dimmer than if only one LED was selected). LED CR36, although not part of the multiplexing system described above, is controlled in a similar manner with a separate dedicated digital control signal: LED32. Like the other LEDs, LED32 is enabled by saturating its associated transistor, Q36.

Referring again to FIG. 10, it will be noted that the components are indicated by type and value in the case of resistors and capacitors. Also, the voltages are indicated. It will be understood that these component types and voltages are given solely for purposes of illustration of a presently preferred embodiment, and not by way of limitation.

The circuit shown in FIG. 10 as explained above allows multiplicity of photodiodes CR36 to 68 to be parallel connected and controls the input to the transimpedance amplifier U6, whose input is the sum of the individual diode photocurrents into the active region, independent of ambient lighting conditions presented to the photodiode. The circuit shown in FIG. 10 also compensates for dark current as well as non-ideal characteristics of the transimpedance amplifier U6 itself. The circuit provides DC coupling from the photodetectors, with the same effect as an AC coupled circuit, without thermal and other effects which are undesirable and arise out of capacitively coupling photodiodes. The circuit avoids the need for multiplexing numerous photodiodes which would ordinarily multiply their dark current leakage by a factor of N where N is the number of photodiodes connected in parallel.

The photodiodes are shown in successive rows. However, they are linearly arrayed being in each of the 32 holes shown in FIGS. 2 to 5. Photodiode CR69 is in the lefthand hole and scans the lefthand edge of the paper to detect the timing marks along the lefthand edge. The other photodiode CR68 scans the right edge timing marks. For a typical application of a voting ballot with right and left edge timing box on both sides of the ballot reference may be had to the above mentioned U.S. Pat. No. 4,774,665. It will be understood that the photodiodes may be arrayed in a manner required by the application and by the location of the data channels of interest on the paper.

The voltage source, such as a battery or power supply is connected via R58 across R59 and R60. U8 is a band gap voltage reference device, which in conjunction with R59 and R60, decouples the +4 volt node across R59 and R60 from noise that may be on the power supply which supplies VCC. R45 and R46 provide a 2.5 volt voltage reference.

Dark current and ambient light and transimpedance amplifier characteristics are compensated by a dark current compensating network made up of amplifier U10A, transistor current source Q37 and the resistors and capacitors R37, R38, R41, R42, R47 and R49 and also signal bypassing capacitors C17 and C18 which make the compensation network operative for slowly varying voltages, such as necessary to provide the dark current and ambient light and transimpedance amplifier characteristic compensation. Data signals are at a much higher frequency and do not affect the compensation network. Amplifier U10A is a frequency compensated error amplifier that compares the output of the transimpedance stage U6 with the reference voltage and control the steady state current in the transimpedance resistor R52. The amplified difference voltage controls the base current of Q37. Q37 provides the bias current which is injected into the photodiode summing node which the node at the inverting input (2) of U6. In steady state, as the sum of photocurrents increase the output voltage from U6 at output terminal (6) increases. This causes U10A output to decrease. The base current flow in Q37 then increases. This leads to an increase in collector current from Q37. Since this collector current is injected into the photocurrent summing node in a direction that opposes the photocurrent from the photodetectors CR36 through CR68 the output of amplifier U6 is compensated, because the feedback loop formed via U10A reduces the difference between the output voltage at U6 terminal 6 and the reference voltage.

Capacitors C17 and C18 make the frequency response of U10A sufficiently low so that signals representing the changes in the photodiode current with the marks on the paper are detected while the relatively slow changes due to dark current, ambient light and amplifier characteristics is compensated.

The TM1 detector CR69 signal is amplified in a transimpedance stage U9A to which the photodetector is connected at the non-inverting input thereof. The output is a pulse which is edge detected by an edge detector and supplied to the microprocessor 140 (see FIG. 9). Shielding is preferably used on the sensor board adjacent signal carrying leads, and is shown by the dotted lines.

From the foregoing description it will be apparent that there has been provided an improved sensor for sensing and reading optically discernable information, and particularly marks on a sheet such as a paper ballot. Variations and modifications in the herein described apparatus and circuitry as well as other applications for the invention, in addition to reading of ballots in an electronic computerized vote counting system, will undoubtedly suggest themselves to those skilled in the art. Accordingly the foregoing descriptions should be taken as illustrative and not in a limiting sense.

We claim:

1. An optical sensor which comprises a board extending laterally over a path along which is moveable a sheet containing marks in selected areas in adjacent columns which extend longitudinally of the sheet, an array of a plurality of light sources and photodetectors each including a separate light source and photodetector which are mounted on said board, the separate light sources and photodetectors being spaced laterally and offset longitudinally from each other to provide said array, a rod defining a cylindrical lens mounted on said board and extending laterally along said board to define a plurality of discrete, laterally spaced zones coincident with said areas of said columns in which zones illumination from said sources is focused and from which zones illumination is focused on said detectors.

2. The sensor according to claim 1 wherein said board had fixturing means for mounting said sources and photodetectors in aligned relationship with each other and with said rod on said board.

3. The sensor according to claim 2 wherein said fixturing means includes alignment openings in said board.

4. The sensor according to claim 3 wherein said sources are light emitting diodes having lenslets on noses extending therefrom, said noses being disposed in said alignment openings.

5. The sensor according to claim 4 wherein said photodetectors are photodiodes which are mounted on the same side of said board as said LED over certain of said openings.

6. The sensor according to claim 1 wherein said detectors are photodiodes and said detectors which are focused at said zones over said selected areas in said adjacent columns are connected in parallel.

7. The sensor according to claim 6 further comprising a source of bias current connected to a summing junction to which all of said detectors are connected in parallel, means responsive to said current for compensating for dark currents produced by said photodetector internally and in response to ambient illumination.

8. The sensor according to claim 1 further comprising polarizers having transmissivity for polarized light in orthogonal transverse directions of polarization between said sources and said rod lens and between said rod lens and said detectors, respectively.

9. The sensor according to claim 8 wherein the polarizer in the path of light from said source passes light polarized in the plane of incident light and the polarizer which passes light to said detectors passes light which is polarized perpendicularly to the light passed by the polarizer from said source.

10. The sensor according to claim 9 wherein sources and detectors and lens constrains a beam from said source to said zone via said rod and the optical axis of the beam from said zone to said detector to define an acute angle with respect to each other.

11. The sensor according to claim 10 wherein said acute angle is approximately 36°.

12. The sensor according to claim 1 further comprising means for strobing said sources successively and means for reading data from said photodetectors concurrently with the strobing of said sources to provide information relating to marks in said columns.

* * * * *